United States Patent [19]

Takase

[11] 4,372,274
[45] Feb. 8, 1983

[54] DIGITAL CONTROL SYSTEM FOR INTERNAL COMBUSTION ENGINE

[75] Inventor: Sadao Takase, Yokohama, Japan

[73] Assignee: Nissan Motor Company, Limited, Yokohama, Japan

[21] Appl. No.: 146,015

[22] Filed: May 2, 1980

[30] Foreign Application Priority Data

May 4, 1979 [JP] Japan .................................. 54-54062

[51] Int. Cl.³ .......................... F02P 5/04; F02B 3/00; H03K 5/13
[52] U.S. Cl. .................................. 123/491; 123/424; 123/480; 123/417; 364/431
[58] Field of Search ............... 123/424, 491, 480, 417; 364/431

[56] References Cited

U.S. PATENT DOCUMENTS 4,157,699 6/1979 Muri .................................. 123/424
4,282,574 8/1981 Yoshida .............................. 123/491

Primary Examiner—Ronald B. Cox
Attorney, Agent, or Firm—Schwartz, Jeffery, Schwaab, Mack, Blumenthal & Koch

[57] ABSTRACT

A digital control system includes sensors, a multiplexer, an A-D converter, an input register, an arithmetic unit and a memory unit, an output register, an output unit, and actuators. The digital control system thus formed has an initializing routine stored in the memory unit in addition to the programs to execute normal control operations. This routine is executed immediately after the control system starts, so that predetermined temporary initial values can be set in the input or output register in order to obtain stable arithmetic operation results or to output a stable control signal even when the engine is not yet ready for outputting stable information. The control system thus improved can control an internal combustion engine stably immediately after the engine is started.

4 Claims, 6 Drawing Figures

DIGITAL CONTROL SYSTEM FOR INTERNAL COMBUSTION ENGINE

BACKGROUND OF THE INVENTION

1. Field of the Invention

The present invention relates generally to a digital control system for an internal combustion engine, and more particularly to an initializing routine stored in a memory unit provided in the control system which includes sensors for detecting engine operating parameters, a multiplexer for selecting a sequence of the detected parameters, an A-D converter for converting the detected engine operating parameters from analog to digital, an input register for storing the digital parameter signals, an arithmetic unit for computing engine controlling values based on the values in the input register, an output register for storing the arithmetic operation results, an output unit for outputting the engine controlling values in accordance with output-command timing signals, and a memory unit for storing programs, routines, etc.

2. Description of the Prior Art

The background of the present invention will be particularly explained with respect to its application to a digital control system.

A digital control system may be used for controlling an internal combustion engine. In this case, various sensors are used for detecting various engine operating parameters, and the analog inputs of the sensors are supplied in order into an A-D converter to convert the analog inputs into digital inputs through a multiplexer which can select the respective channels of the analog inputs in accordance with a program stored in the memory. The information thus converted by the A-D converter is next processed by an arithmetic unit in cooperation with an input register and an output register in accordance with the programs stored in the memory. The arithmetic outputs thus executed are then taken out in order through an output unit in accordance with output-command timing signals to control the engine.

In the digital control system as mentioned above, the times necessary for arithmetic operations to determine the respective control value vary according to engine operating parameters, and also the output timings after the arithmetic operations are completed vary according to engine operating conditions. In other words, different conversion times and different arithmetic operation times are required according to the respective engine operating parameters in the operation processes from input to output. Therefore, various timing signals are necessary for this control system. However, immediately after the control system begins to operate, the input timing for receiving information from the sensor may not be synchronized with the respective output timing to drive an actuator. Consequently, the completion of input conversion is not synchronized with the start of arithmetic operation, nor is the completion of arithmetic operation synchronized with the timing of output. As a result, problems are encountered immediately after the engine is started because the control system is not yet working stably. Among these problems, the first is uncertainty in the arithmetic results due to the fact that the arithmetic operations start before the input information becomes stable. Another is uncertainty in the output results due to the fact that the output-command timing signal is given to the output unit before the output value is determined stably.

SUMMARY OF THE INVENTION

With these problem in mind, therefore, it is a primary object of the present invention to provide a digital control system for an internal combustion engine such that stable control can be obtained even immediately after the engine is started.

Another object of the present invention is to provide a digital control system for an internal combustion engine such that the input timing signal for arithmetic operations is received after a predetermined initial value is preset in the input register, in order to obtain accurate arithmetic operation results immediately after the power supply is turned on.

A further object of the present invention is to provide a digital control system for an internal combustion engine such that the output timing signal is received after a predetermined initial value is preset in the output register in order to perform an accurate control immediately after the power supply is turned on.

The above and other objects are accomplished by, the present invention which provides a digital control system for an internal combustion engine wherein an initializing routine is executed immediately after the control system starts so that a predetermined temporary initial value can be set to the input or output register for initialization.

BRIEF DESCRIPTION OF THE DRAWINGS

The features and advantages of the digital control system for an internal combustion engine according to the present invention over the prior-art digital control system will be more apparent from the following description of the preferred embodiment of the invention taken in conjunction with the accompanying drawings, in which like reference numerals designate the same or similar sections throughout the figures thereof and wherein.

DETAILED DESCRIPTION OF THE PREFERRED EMBODIMENT

Figure 1:
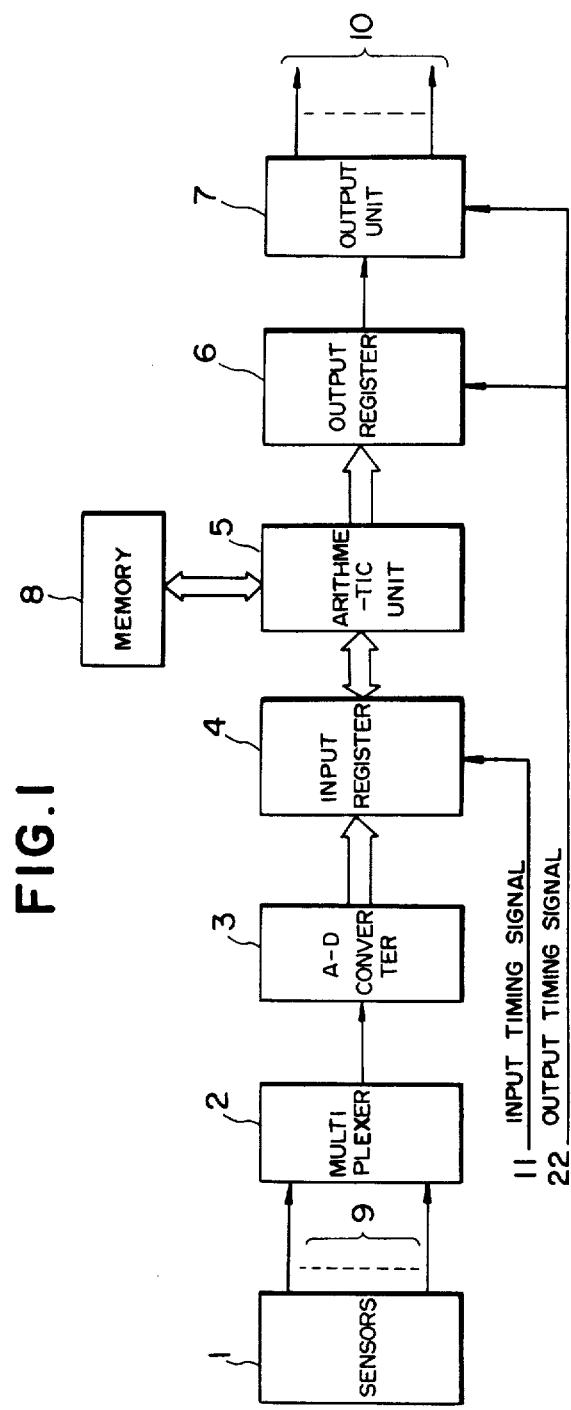
FIG. 1 is a basic schematic block diagram of the digital control system of the present invention.

Referring first to the configuration of FIG. 1, a plurality of analog inputs 9 of internal combustion engine operating parameters are detected by a plurality of sensors 1 and then applied to a multiplexer 2, and the output of the multiplexer 2 is supplied to an A-D converter 3. The respective channels of the multiplexer 2 are selected and input to the A-D converter 3 in a predetermined order in accordance with a program stored in a memory 8. The A-D converter 3 begins to operate the moment the multiplexer output is supplied to the A-D converter 3, and the converted values are stored in an input register 4 after conversion from analog to digital. The values stored in the input register 4 are read where necessary by an arithmetic unit 5 (provided in a central processing unit) and then transferred to predetermined memory areas in a memory 8. That is, the respective input values are converted, and stored in the predetermined memory areas of the memory 8 in time sequence in accordance with the selection order of the multiplexer 2.

An arithmetic unit 5 begins to operate in accordance with input timing signals (engine operation starts timing signals 11) such as power supply on and crank angle timing pulse fed from the engine, or timer signals generated at constant time intervals. In this case, the values to be operated on arithmetically are fuel injection rate, ignition timing, alarm indications, etc. That is, the arithmetic operations are carried out on the engine operating parameters and engine operation starts timing signals 11. The results of arithmetic operation are next stored in an output register 6, and converted through an output unit 7 into engine controlling values 10 to drive actuators when an output-command timing signal 22 inputted from outside is received by both the output register 6 and the output unit 7.

When a control program is used for implementing the multiplexer channel section, A-D conversion, arithmetic operation, and arithmetic operation storage or arithmetic operation result storage in the digital control system of the above-mentioned basic configuration, there has been a problem in that the conversion of engine operating parameters may be late for the arithmetic operations during the starting of the control system, that is, immediately after the power supply is turned on to operate the control system. In order to cope with this problem, therefore, it is necessary to preset, in areas holding input information and output values, initial input values used for executing the initial arithmetic operations or initial output values used for specifying the initial conditions.

Figure 2:
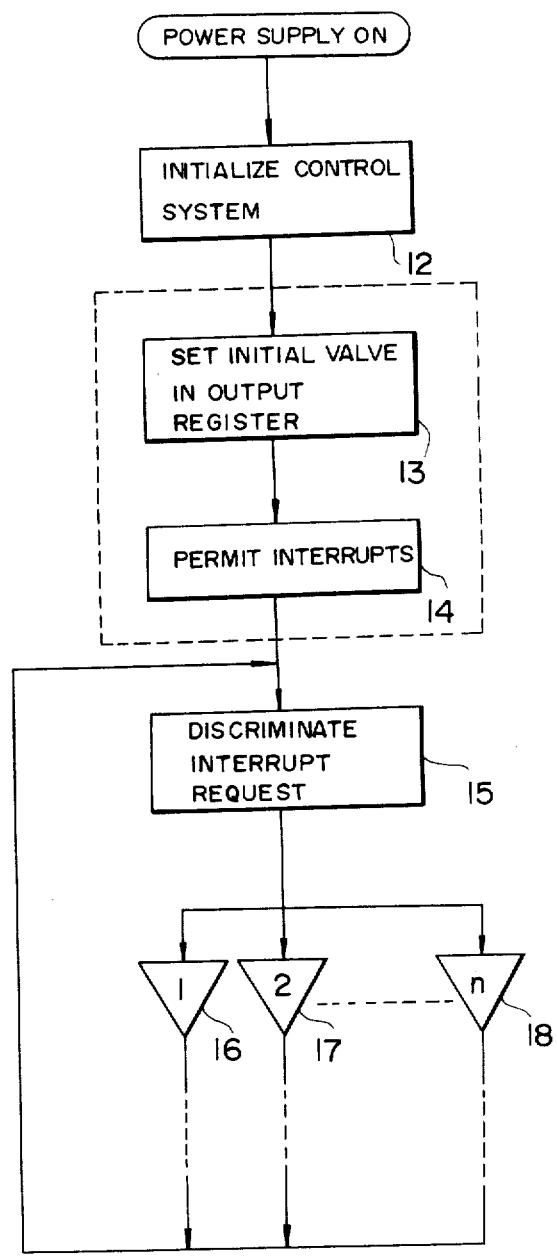
FIG. 2 is a flowchart showing initialization and interruption in the digital control system of the present invention of FIG. 1.

FIG. 2 is a flowchart of the digital control system of the present invention. In this case, the initial output values are preset in the output register 6.

In this flowchart, when the power supply is turned on, the control system is first initialized (block 12). Immediately after this initialization, the initial values are read into the output register 6 (block 13) for initialization. After that, the interrupt signals such as constant timing signals are permitted to interrupt the program in order to transfer control to other routines for implementing the usual arithmetic operations (block 14). After the interrupt requests are discriminated (block 15), the respective arithmetic processes (1, 2 . . . n) are repeatedly executed under stable conditions (processes 16, 17 and 18). That is, the control is accomplished in accordance with the above mentioned initial values until stable arithmetic values are given to the output register 6 from the sensors.

This invention will now be explained in more detail. In the case of a microcomputer, when the power supply is turned on, initial processes predetermined by a program are executed at the start of the system. These initial processes include multiplexer channel selection, A-D conversion, and arithmetic operations to determine initial control outputs for the respective actuators. The respective routines for the above initial processes are executed repeatedly in accordance with timing signals given from outside such as engine revolution signals, or timer signals generated at constant time intervals. By presetting the initial values into the control system before the system performs normal, stable operation, it is possible to obtain proper arithmetic operation results or output values even immediately after the control system is started.

The temporary input values are replaced with actual input values after the stable input values have been obtained from the A-D converter, and the temporary output values are replaced with actual output values after stable arithmetic operation results have been obtained from the arithmetic unit.

Figure 3A:
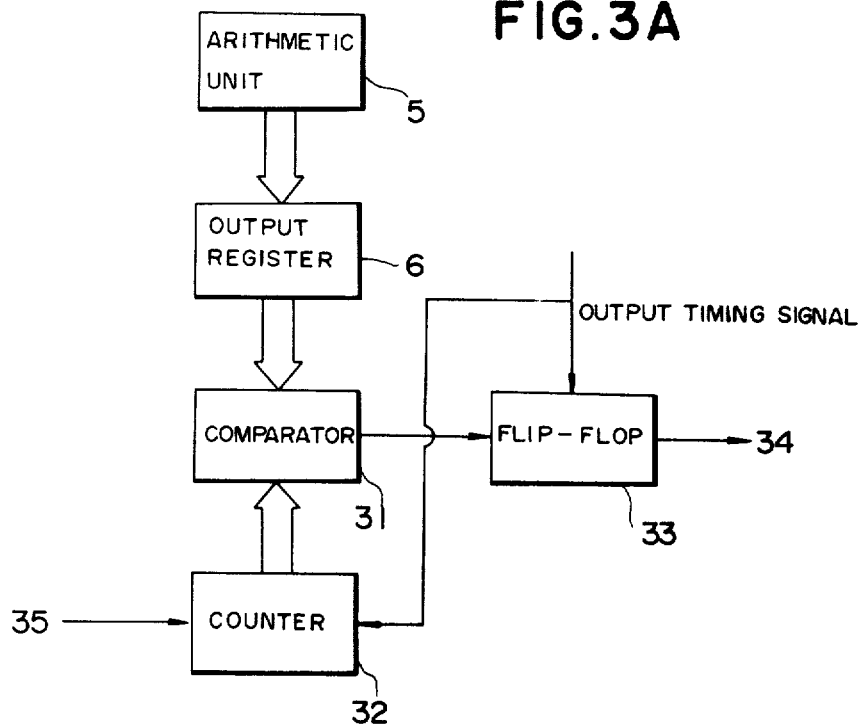
FIGS. 3A and 3B are a schematic block diagram showing the output unit and corresponding timing chart, respectively.
Figure 3B:
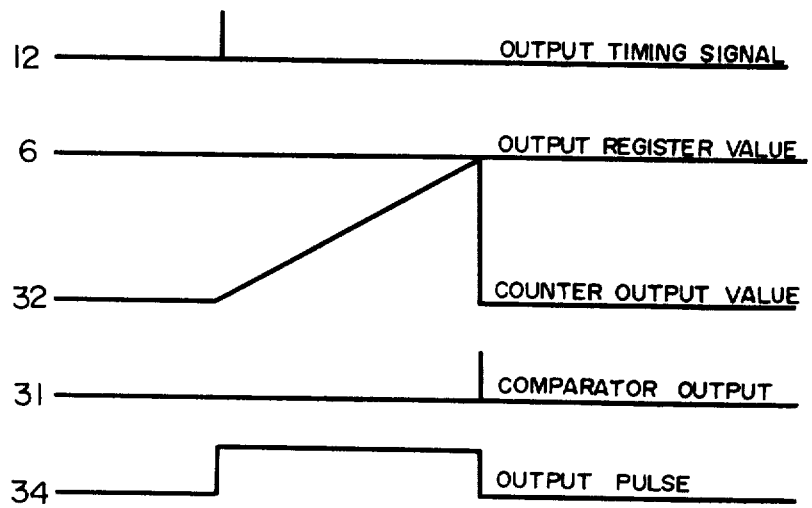

Referring to FIGS. 3A and 3B, an output unit including 31, 32, and 33 to control pulse outputs for fuel injection rate will be described below in more detail as an example. In this case, the output values used immediately after the control system starts are previously stored in the output register 6 as the initial values.

Fuel injection rate (Pw) can be determined as follows:

$$Pw = Q/N \times K$$

where Q is the intake air amount, N is the engine revolution speed, and K is a conversion factor. In order to execute the above operation, it is necessary to have previously determined both Q and N. However, since the number of engine revolutions will not be counted until after a revolution signal is outputted and since the output-command signal will be synchronized with the first revolution signal, it is impossible to use the first arithmetic value for the first fuel injection rate. Therefore, it is necessary to use a temporary value predetermined for the first fuel injection rate. In other words, there are some cases where it is impossible to respond to the first fuel injection demand if only the arithmetic values are used for control.

To explain in more detail the normal, stable operation of the output unit 7 by referring to FIGS. 3A and 3B, the output values produced by the arithmetic unit 5 are transferred to the output register 6 in accordance with the predetermined timing signals. The output-command signal 22 activates a counter 32 to determine time intervals while the control signal is being outputted, and at the same time sets a flip-flop 33 to ON. If the value of the counter 32 becomes equal to the value stored in the output register 6, a comparator 31 generates an output signal to reset the flip-flop 33 to OFF, as depicted in FIG. 3B. The output of the flip-flop 33 becomes a pulse output 34, and also a clock pulse 35 is supplied to the counter 32 for timing. However, in the output unit thus formed, since the value in the output register 6 is not yet determined when the first output-command signal 22 is given at the start of the system, no pulse output 34 is generated and the flip-flop 33 is kept in the reset state.

In this case, however, as already explained in FIG. 2, a routine (block 12) for initializing the control system writes an initial value (block 13) to the output register 6 immediately after the power supply is turned on. That is, the arithmetic unit 5 in FIG. 3A reads the predetermined initial value from the memory 8 and writes it in the output register 6 for initial control. After that, the normal, stable pulse output 34 is output in accordance with the interrupt signals of FIG. 2, that is, whenever the respective timing signals are received.

Therefore, two kinds of sequence of instructions for the arithmetic unit 5 are necessary. That is, the first one is an initializing routine executed for obtaining the initial value immediately after the power supply is turned on, and the second one is a plurality of arithmetic operation routines executed for obtaining the normal, stable values in accordance with the respective timing signals as interrupt signals, which have already shown in FIG. 2 as the arithmetic operations 16, 17 ... 18 (from 1 to n). These routines are repeatedly executed in accordance with the revolution signals, timer signals, etc.

Figure 4:
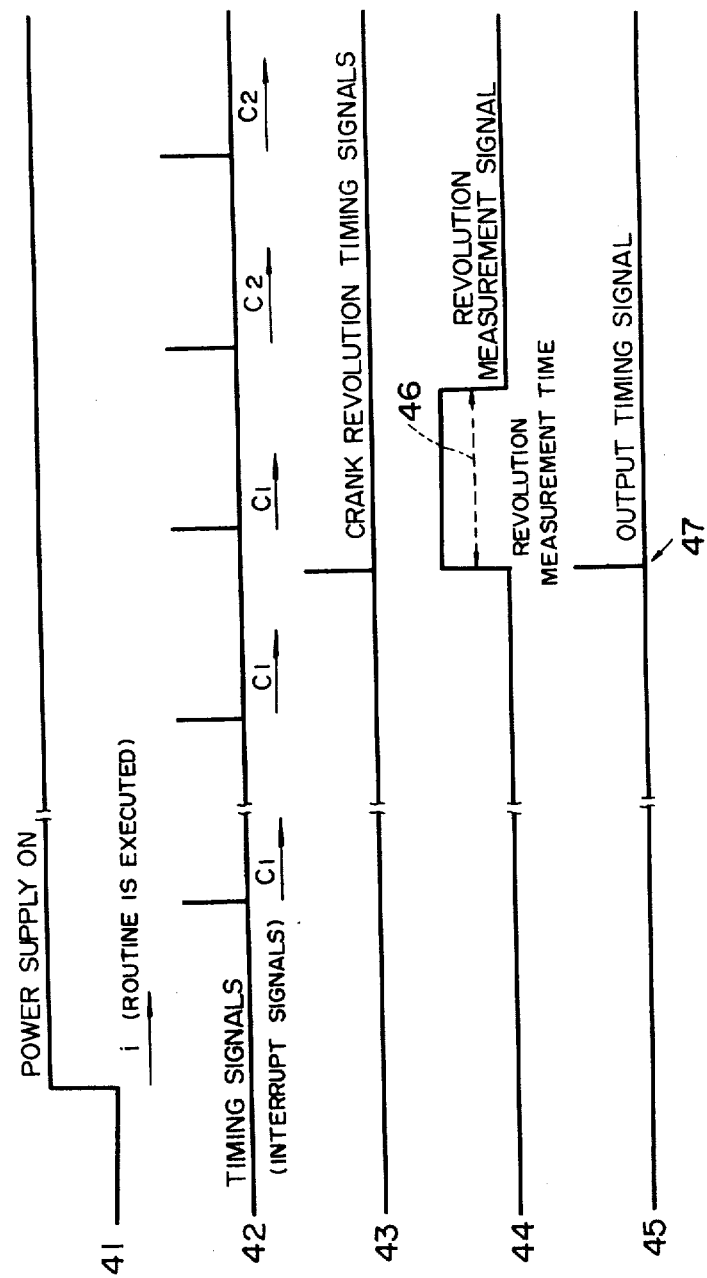
FIG. 4 is a timing chart showing the arithmetic operation timing and the output timing in the digital control system.

FIG. 4 shows the relations between the arithmetic operation timing and the output timing. Immediately after the power supply (41) is turned on, the arithmetic unit executes a sequence of instructions necessary for the system to look at a specified address in the memory area. Accordingly, by storing the start address of the required routine i in this specified address, the required routine is executed immediately after the power supply is turned on.

In FIG. 4, since the data-transferring commands, are included in the routine i, the initial values are read into the specified memory addresses by the program. In this figure are shown both the constant interval timing signals (42) generated at predetermined time intervals and the timing signal (crank revolution signal) 43 generated at every revolution through 120° of the crankshaft.

The arithmetic unit receives the constant interval timing signals 42 as interrupt signals to execute the routines $C_1$ and $C_2$. The arithmetic operations before the timing signals (crank revolution signal) 43 is inputted for execution in accordance with $C_1$, and the arithmetic operations after the timing signal 43 is inputted for execution in accordance with $C_2$. The arithmetic operations for determining a fuel injection pulse in accordance with the above expression are executed by routine $C_2$ for stable control. The generation of the timing signal 43 indicates that the crank has begun to rotate, and the revolution measurement signal begins to count the angle pulses generated within a predetermined period of time (46) after the timing signal 43 is generated, as explained in FIGS. 3A and 3B; that is, the angle pulses produced at intervals of a small crank angle such as 1° or 2°, synchronized with the revolution of the crankshaft, within a predetermined period of revolution measurement time (46). The output-command signal 45 is almost synchronized with the timing signal 43 in the case of the output of a fuel injection rate. It is therefore necessary to determine the first fuel injection rate based upon the first output command signal 47 in accordance with the routine $C_1$ for determining the temporary value, since no result from the routine $C_2$ has yet been obtained. As depicted in FIG. 4, the routine $C_2$ begins to be executed after the revolution measurement time 46 is terminated, so that stable arithmetic operation results can be obtained in accordance with the above-mentioned expressions for determining the fuel injection rate.

Figure 5:
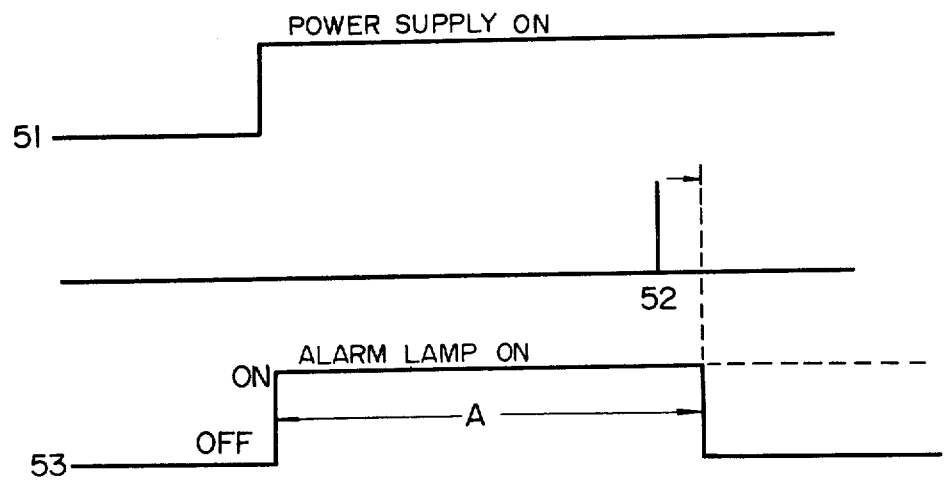
FIG. 5 is a timing chart of alarm indicator lamp checking operations in the digital control system.

FIG. 5 shows another embodiment of the present invention. This case shows a checking operation of an alarm indicator lamp. In the figure, the output 53 of an alarm indicator lamp is so designed as to be turned on when the power supply output 51 is turned on. Accordingly, the alarm indicator lamp is turned on when the control system begins to operate and the predetermined arithmetic operations of the alarm lamp begin in accordance with a signal 52 starting from a given time after the control system begins to operate. If the arithmetic operations are normal the alarm lamp goes off, and if not normal the alarm lamp stays on. Therefore, it is possible to make sure that there is no problem with the control system. It is very important to make such an additional initialization from the standpoint of safety.

As described above in detail, according to the present invention, an initializing routine is executed in order to set a temporary initial value to the output register immediately after the control system starts and the usual arithmetic routine is executed after execution of the initializing routine. It is possible to control the internal combustion engine in accordance with a temporary value even when the arithmetic operations are not in time for the first output command with the present invention it is also possible to solve the problems associated with uncertainty of the system operation due to the absence or instability of initial input information.

It is further to be understood by those skilled in the art that the foregoing description is of preferred embodiments of the present invention and that various changes and modifications may be made without departing from the spirit and scope of thereof.

What is claimed is:

1. A digital control system for an internal combustion engine provided with a microcomputer, which comprises:

(a) a plurality of sensors for detecting various engine operating parameters and for outputting signals corresponding thereto;

(b) a multiplexer connected to said sensors for selecting a sequence of detected engine operating parameters in accordance with a program stored in the microcomputer;

(c) an input register connected to said multiplexer for storing engine operating parameters detected by said sensors and for outputting the stored parameters in response to input timing signals inputted thereto;

(d) a memory unit provided in the microcomputer, said memory unit storing both programs for executing arithmetic operations to control said internal combustion engine and initialization routines for presetting predetermined initial values in said input register after the power supply is turned on and before the first input timing signal is inputted to said input register;

(e) an arithmetic unit connected to said input register and said memory unit for executing arithmetic operations to obtain first engine controlling values on the basis of both the program stored in said memory unit and the preset initial values transferred to said input register from said memory in accordance with said initialization routines, said preset initial values being transferred to said input register in response to a first input timing signal subsequent to system power turn-on, and outputting first calculated values therefrom, said arithmetic unit executing arithmetic operations to calculate subsequent engine controlling values on the basis of said program for executing arithmetic operations stored in said memory unit and said engine operating parameters detected by said sensor and transferred thereto in response to at least one subsequent input timing signals, and outputting subsequent calculated values therefrom; and (f) an output register connected to said arithmetic unit for storing engine controlling values calculated and outputted by said arithmetic unit and outputting values in response to output timing signals inputted thereto, whereby said first engine controlling values are calculated on the basis of the stored preset initial values transferred to said arithmetic unit from said memory in accordance with the initialization routine.

2. A digital control system for an internal combustion engine provided with a microcomputer, which comprises:
   (a) a plurality of sensors for detecting various engine operating parameters and for outputting signals corresponding thereto;
   (b) a multiplexer connected to said sensors for selecting a sequence of detected engine operating parameters in accordance with a program stored in the microcomputer;
   (c) an input register connected to said multiplexer for storing engine operating parameters detected by said sensors and for outputting the stored parameters in response to input timing signals inputted thereto;
   (d) a memory unit provided in the microcomputer, said memory unit storing both programs for executing arithmetic operations to control an internal combustion engine and initialization routines;
   (e) an arithmetic unit connected to said input register and said memory unit for executing arithmetic operations to obtain engine controlling values on the basis of the program stored in said memory unit and the engine operating parameters detected by said sensor and transferred thereto from said input register in response to input timing signals, said arithmetic unit outputting therefrom the calculated results; and
   (f) an output register connected to said arithmetic unit for storing first initial engine controlling values transferred thereto in accordance with the initialization routines stored in said memory unit and for outputting first engine controlling values therefrom in response to first output timing signals inputted thereto after system power supply turned on, said output register storing subsequent engine controlling values calculated by said arithmetic unit in accordance with the program stored in said memory unit and outputting the subsequent engine controlling values therefrom in response to at least one subsequent output timing signals inputted thereto;
   whereby said first initial engine controlling values transferred to said output register from said memory unit in accordance with said initialization routines are outputted from said output register in response to the first output timing signal.

3. The control system of claim 1 or 2, further including an indicator lamp adapted to turn on when said system power is turned on and to turn off when said programs for executing authentic operations are executed.

4. A method of enhancing operation of a control system for an internal combustion engine which is controlled by a computer means normally operable under control of an operating program for sensing engine operating parameters, processing said operating parameters and generating engine controlling values for controlling said engine, said method comprising the steps of:
   (a) storing initial values corresponding to at least one of (1) a preset input value and (2) a preset output value;
   (b) detecting an electronic signal indicative of system power-on;
   (c) detecting crank revolution timing signals indicative of predetermined amounts of crankshaft revolution;
   (d) detecting timing signals generated at predetermined time intervals by a clock of said computer;
   (e) in response to at least one of said timing signals, said power-on signal and the absence of any crank revolution signals occurring subsequent to said power-on signal, operating said computer for executing an initialization routine for performing at least one of (1) transferring said preset input value into an input register of said computer for simulating the sensed engine operating parameter normally sensed by sensors of said engine, and subsequently processing said preset input value under control of said operating program to generate at least one of said engine controlled values, and (2) transferring said preset output value into an output register of said computer for simulating at least one of said generated engine controlled values of said operating program; and
   (f) controlling said engine at least prior to receipt of said first crank revolution timing signal occurring subsequent to said power-on signal by at least one of (1) said at least one engine controlling value calculated by said computer from said preset input value and (2) said simulated engine controlling value derived from said preset output value.

* * * * *